US010090753B1

(12) United States Patent
Hasegawa et al.

(10) Patent No.: US 10,090,753 B1
(45) Date of Patent: Oct. 2, 2018

(54) POWER CONVERSION DEVICE AND POWER CONVERSION SYSTEM

(71) Applicant: KABUSHIKI KAISHA TOSHIBA, Minato-ku (JP)

(72) Inventors: Kohei Hasegawa, Minato-ku (JP); Sari Maekawa, Minato-ku (JP); Takenori Yasuzumi, Minato-ku (JP); Atsuhiko Kuzumaki, Minato-ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/926,278

(22) Filed: Mar. 20, 2018

(30) Foreign Application Priority Data

Mar. 21, 2017 (JP) ................................ 2017-054312
May 12, 2017 (JP) ................................ 2017-095561

(51) Int. Cl.
*H02M 1/12* (2006.01)
*H02M 7/537* (2006.01)
*H02H 9/08* (2006.01)
*H02J 3/01* (2006.01)

(52) U.S. Cl.
CPC ................ *H02M 1/12* (2013.01); *H02H 9/08* (2013.01); *H02J 3/01* (2013.01); *H02M 7/537* (2013.01)

(58) Field of Classification Search
CPC .......... H02M 1/12; H02M 7/537; H02H 9/08; H02J 3/01
See application file for complete search history.

(56) References Cited

U.S. PATENT DOCUMENTS

| | | | | |
|---|---|---|---|---|
| 6,987,372 B1 * | 1/2006 | Wu | H02M 5/4585 | 318/448 |
| 8,169,179 B2 * | 5/2012 | Mohan | H02M 5/271 | 318/722 |
| 2010/0045108 A1 * | 2/2010 | Hu | H02M 5/4585 | 307/31 |
| 2011/0292695 A1 * | 12/2011 | Skibinski | H02M 5/458 | 363/37 |
| 2014/0268933 A1 * | 9/2014 | Zhou | H02M 1/12 | 363/44 |
| 2015/0009727 A1 * | 1/2015 | Zhou | H02M 1/44 | 363/40 |

FOREIGN PATENT DOCUMENTS

| | | |
|---|---|---|
| JP | 5701631 | 4/2015 |

* cited by examiner

*Primary Examiner* — Jue Zhang
(74) *Attorney, Agent, or Firm* — Oblon, McClelland, Maier & Neustadt, L.L.P.

(57) ABSTRACT

A power conversion device includes: a first power conversion circuit that converts power inputted from outside and outputs the converted power to a second power conversion circuit connected to the first power conversion circuit via a DC link, which outputs the converted power to a load; smoothing capacitors provided in an output part of the first power conversion circuit and an input part of the second power conversion circuit; a first and second common mode current extraction circuits provided in an input part of the first power conversion and second power conversion circuits; and a virtual neutral potential line that connects the first and second common mode current extraction circuits; a DC link filter circuit that includes a Y-shaped capacitor connected between the DC link part and the virtual neutral potential line.

15 Claims, 7 Drawing Sheets

POWER CONVERSION DEVICE AND POWER CONVERSION SYSTEM

BACKGROUND OF THE INVENTION

Field of the Invention

Embodiments of the present invention relate to a device and a system that convert power inputted from the outside and output the converted power to a load.

Description of the Related Art

For example, when a metal material included in a power conversion device, such as an inverter or a load device, such as a motor, is disposed to face a ground potential, a parasitic capacitance is formed therebetween, and a leakage current is generated via the parasitic capacitance. Since the leakage current leads to deterioration of machines or unexpected electrical shock, there is a need to approximate the leakage current to OA as much as possible. Moreover, due to advanced performance of a semiconductor switching element, an operating frequency of a power conversion device is increased. Since an impedance of the parasitic capacitance is reduced with increase in frequency, it becomes more significant to take measures against the leakage current.

To suppress the leakage current, for example, the impedance to a common mode is increased. Specifically, measures, such as elongating a distance between the ground potential and the facing metal or inserting a common mode choke coil of high inductance into a power line, are taken. However, any of the measures has a problem leading to upsizing of a power conversion device. Moreover, other than the measures against the leakage current, as a purpose of suppressing electromagnetic noises, a capacitor is intentionally connected to the ground potential in some cases. In this case, if a large-capacity capacitor is selected for producing a noise suppressing effect near a low frequency, increase in the leakage current is provoked.

DETAILED DESCRIPTION OF THE PREFERRED EMBODIMENTS

Therefore, embodiments of the present invention provide a power conversion device and a power conversion system including a function capable of suppressing the leakage current while avoiding upsizing thereof.

A power conversion device according to an embodiment includes: a first power conversion circuit that converts power inputted from outside and outputs the converted power; a second power conversion circuit that is connected to the first power conversion circuit via a DC link part and converts inputted power to output the converted power to a load; smoothing capacitors provided in an output part of the first power conversion circuit and an input part of the second power conversion circuit; a first common mode current extraction circuit provided in an input part of the first power conversion circuit; a second common mode current extraction circuit provided in an output part of the second power conversion circuit; a virtual neutral potential line that connects the first common mode current extraction circuit and the second common mode current extraction circuit; a DC link filter circuit that includes a Y-shaped capacitor connected between the DC link part and the virtual neutral potential line; a first common mode coil inserted into a route from the first common mode current extraction circuit to a connection point of the Y-shaped capacitor in the DC link filter circuit; and a second common mode coil inserted into a route from the connection point of the Y-shaped capacitor to the second common mode current extraction circuit.

Note that, the term "Y-shaped capacitor" here means a component connecting one end of each of two capacitors in common; the one common end is connected to a virtual neutral potential line, and the other end of each of the two capacitors is connected to a line connecting between a first and second power conversion circuits in a DC link part.

First Embodiment

Figure 1:
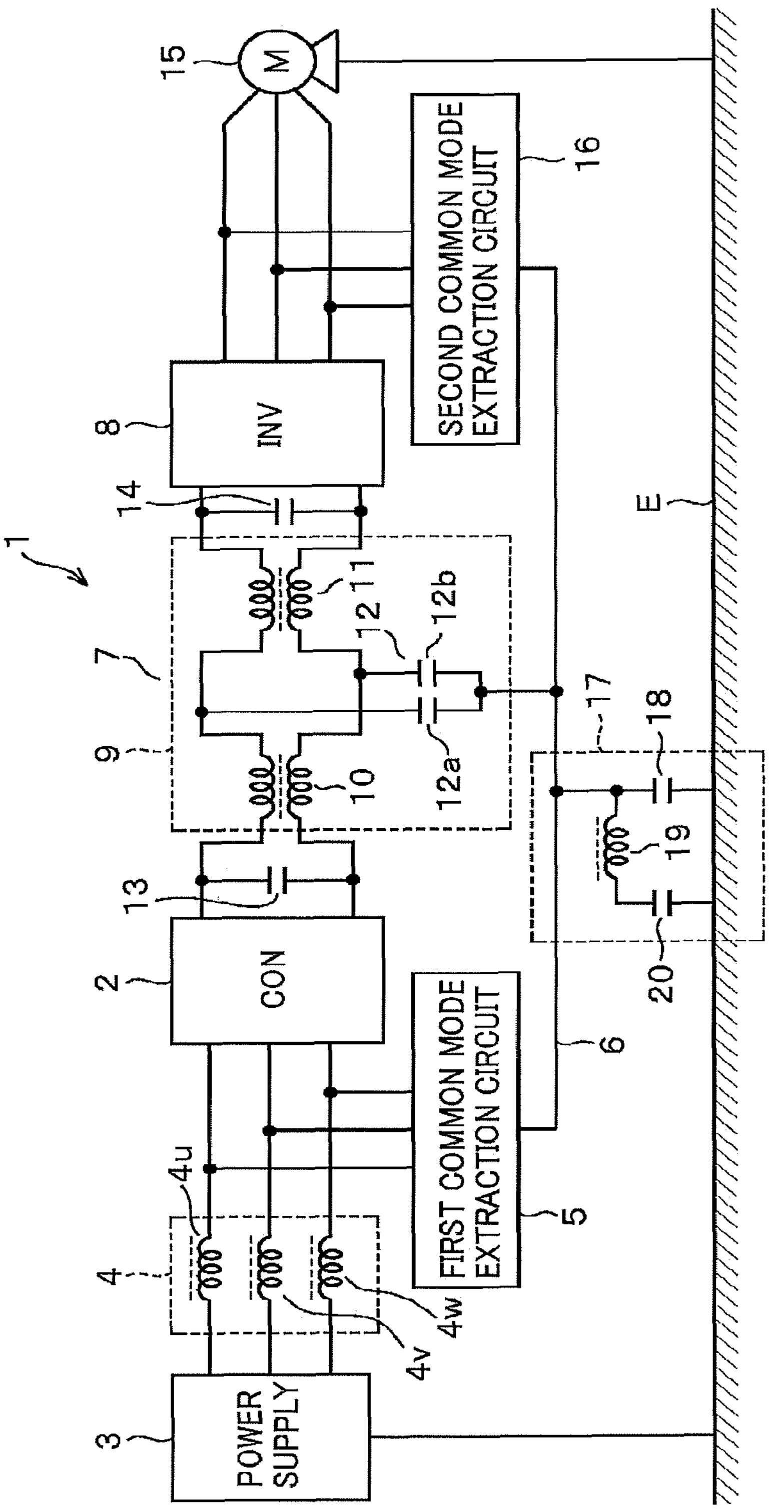
FIG. 1 shows a first embodiment, and is a functional block diagram showing a power conversion device having a three-phase AC input/three-phase AC output configuration.

Hereinafter, the first embodiment will be described with reference to FIG. 1. FIG. 1 shows a power conversion device having a three-phase AC input/three-phase AC output configuration. A power conversion device 1 includes a converter 2 disposed on an input side and corresponding to a first power conversion circuit. Three-phase input terminals of the converter 2 are connected to respective phase terminals of a three-phase AC power supply 3 via an external impedance adjustment circuit 4. The external impedance adjustment circuit 4 includes coils 4*u*, 4*v* and 4*w* corresponding to the respective phases.

Moreover, to the three-phase input terminals of the converter 2, a first common mode extraction circuit 5 is connected. The first common mode extraction circuit 5 includes, for example, not-shown capacitors corresponding to the respective phases; one ends of the three capacitors are connected to the respective corresponding phases, and the other ends are connected in common to a virtual neutral potential line 6. The common mode extraction circuit 5 extracts common mode currents flowing through three-phase AC power supply lines and transfers the currents to the virtual neutral potential line 6. Note that the common mode extraction circuit 5 may include common mode choke coils connected in series between the three-phase capacitors and the virtual neutral potential line 6. The converter 2 converts the inputted three-phase AC current into a DC current and outputs the converted current.

Output terminals of the converter 2 are connected, via a DC link part 7, to input terminals of an inverter 8 disposed on an output side and corresponding to a second power conversion circuit. Into the DC link part 7, a DC link filter circuit 9 is inserted. The filter circuit 9 includes a series circuit of the common mode choke coils 10 and 11; one end of the coil 10 is connected to the output terminals of the converter 2, and one end of the coil 11 is connected to input terminals of the inverter 8. In other words, the series circuit of the coils 10 and 11 is inserted into a route from the converter 2 to the inverter 8. The coils 10 and 11 correspond to first and second common mode choke coils, respectively.

To common connection points of the coils 10 and 11, one ends of two capacitors 12*a* and 12*b* are respectively connected, and the other ends of the capacitors 12*a* and 12*b* are connected in common to the virtual neutral potential line 6. Hereinafter, the two capacitors 12*a* and 12*b*, the other ends of which are connected in common, are referred to as a Y-shaped capacitor 12 in some cases. The filter circuit 9 is a so-called T-shaped common mode filter. Moreover, between the output terminals of the converter 2 and between the input terminals of the inverter 8, smoothing capacitors 13 and 14 are connected, respectively.

The output terminals of the respective phases of the inverter 8 are connected to stator coils of respective phases of a three-phase motor 15 serving as a load. Moreover, between the above-described output terminals of the respective phases and the virtual neutral potential line 6, a second common mode extraction circuit 16, which is similar to the first common mode extraction circuit 5, is connected. A housing of a motor 15 and the power supply 3 are grounded to the earth E. Moreover, between the virtual neutral potential line 6 and the earth E, an LC filter circuit 17 is connected. The LC filter circuit 17 includes a capacitor 18 connected between the virtual neutral potential line 6 and the earth E, and a series circuit of a coil 19 and a capacitor 20, which is connected in parallel with the capacitor 18.

According to this embodiment configured as described above, as compared to the conventional configuration of Patent Literature 1, it is possible to produce greater suppression effect of the leakage current by providing the DC link filter circuit 9 to the DC link part 7, and in addition, providing the LC filter circuit 17 between the DC link filter circuit 9 and the earth E. Moreover, by providing the external impedance adjustment circuit 4 to relatively reduce the impedance on the virtual neutral potential line 6 side, it is possible to further increase the suppression effect of the leakage current.

Second Embodiment

Figure 2:
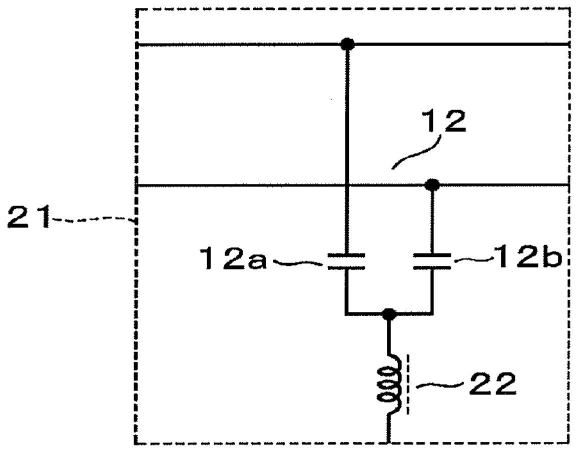
FIG. 2 shows a second embodiment, and is a diagram partially showing a configuration of a DC link filter circuit.

Hereinafter, same parts as those in the first embodiment are assigned with the same reference signs and descriptions thereof are omitted, while different parts will be described. FIG. 2 partially shows a configuration of a DC link filter circuit 21 of the second embodiment alternative to the DC link filter circuit 9. In the DC link filter circuit 21, a coil 22 is inserted between the common connection point of the Y-shaped capacitor 12 and the virtual neutral potential line 6. By use of such a DC link filter circuit 21, it is possible to increase selectivity of frequency to suppress the leakage current.

Third Embodiment

Figure 3:
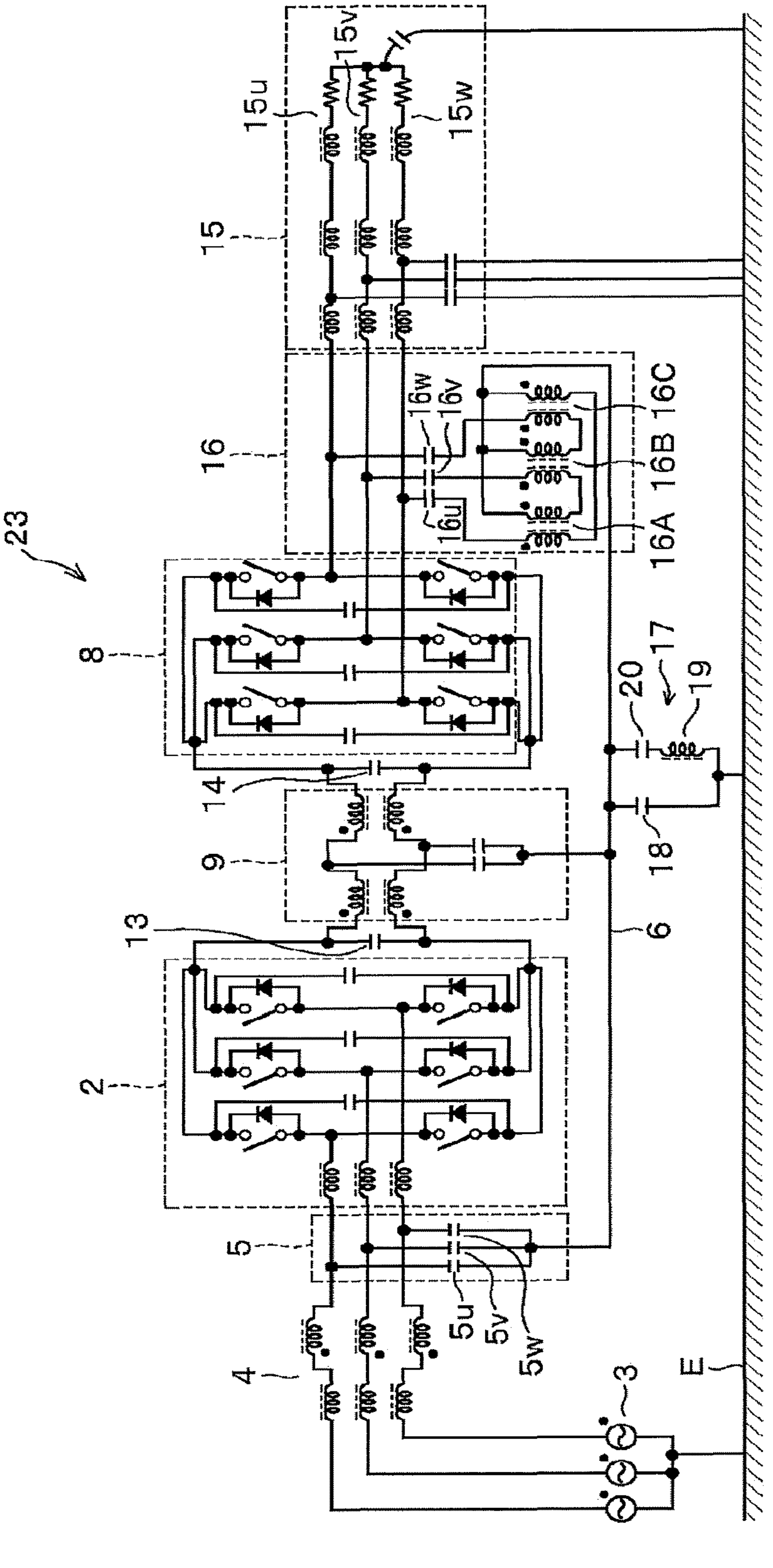
FIG. 3 shows a third embodiment, and is a diagram showing the configuration of the first embodiment in more detail.

A power conversion device 23 of the third embodiment shown in FIG. 3 shows each component of the power conversion device 1 of the first embodiment more specifically and changes a part of the configuration. The first common mode extraction circuit 5 includes, as described in the first embodiment, capacitors 5*u*, 5*v* and 5*w* corresponding to the respective phases. A second common mode extraction circuit 16 includes capacitors 16*u*, 16*v* and 16*w* corresponding to the respective phases, and common mode choke coils 16A, 16B and 16C connected between these capacitors and the virtual neutral potential line 6.

Each of the converter 2 and the inverter 8 is configured by connecting six switching elements in a three-phase bridge configuration. To each switching element, a return diode is connected in anti-parallel, and between arms of the respective phases, capacitors are connected in parallel. Note that, as to a motor 15, together with stator coils 15*u*, 15*v* and 15*w* of the respective phases, wiring resistance, wiring inductance and the parasitic capacitance formed between the motor 15 and the earth E are shown. Moreover, as to the LC filter circuit 17, as a variation, the connecting direction thereof between the virtual neutral potential line 6 and the earth E is opposite to that of the first embodiment.

To suppress component of the leakage current in which a peak occurs at the frequency higher than the switching frequencies in the converter 2 and the inverter 8 by the resonance phenomenon, the time constant of the LC filter circuit 17 is set to show low impedance at the frequency providing the peak. At this time, the total capacitance of the LC filter circuit 17 is set to the extent that the leakage current component at the switching frequency causes no problem.

Figure 4:
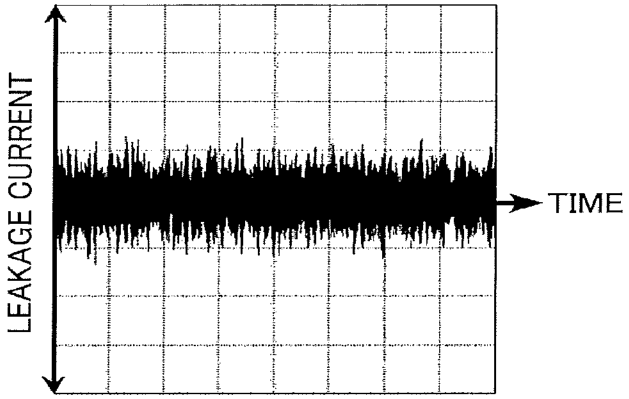
FIG. 4 is a diagram showing a waveform of a leakage current generated when the configuration of the third embodiment is applied.
Figure 5:
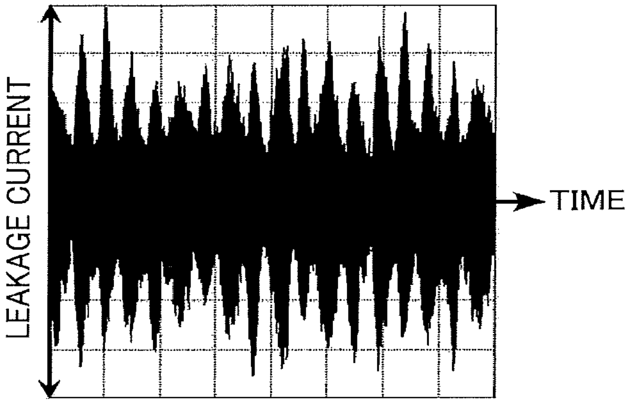
FIG. 5 is a diagram showing a waveform of a leakage current generated when a conventional configuration is applied.

FIG. 5 shows a waveform of the leakage current generated in the conventional configuration of Patent Literature 1, and FIG. 4 shows a waveform of the leakage current generated in the configuration of the third embodiment. In the configuration of the third embodiment, the maximum amplitude of the leakage current is about one-quarter of that of the conventional configuration.

Fourth Embodiment

Figure 6:
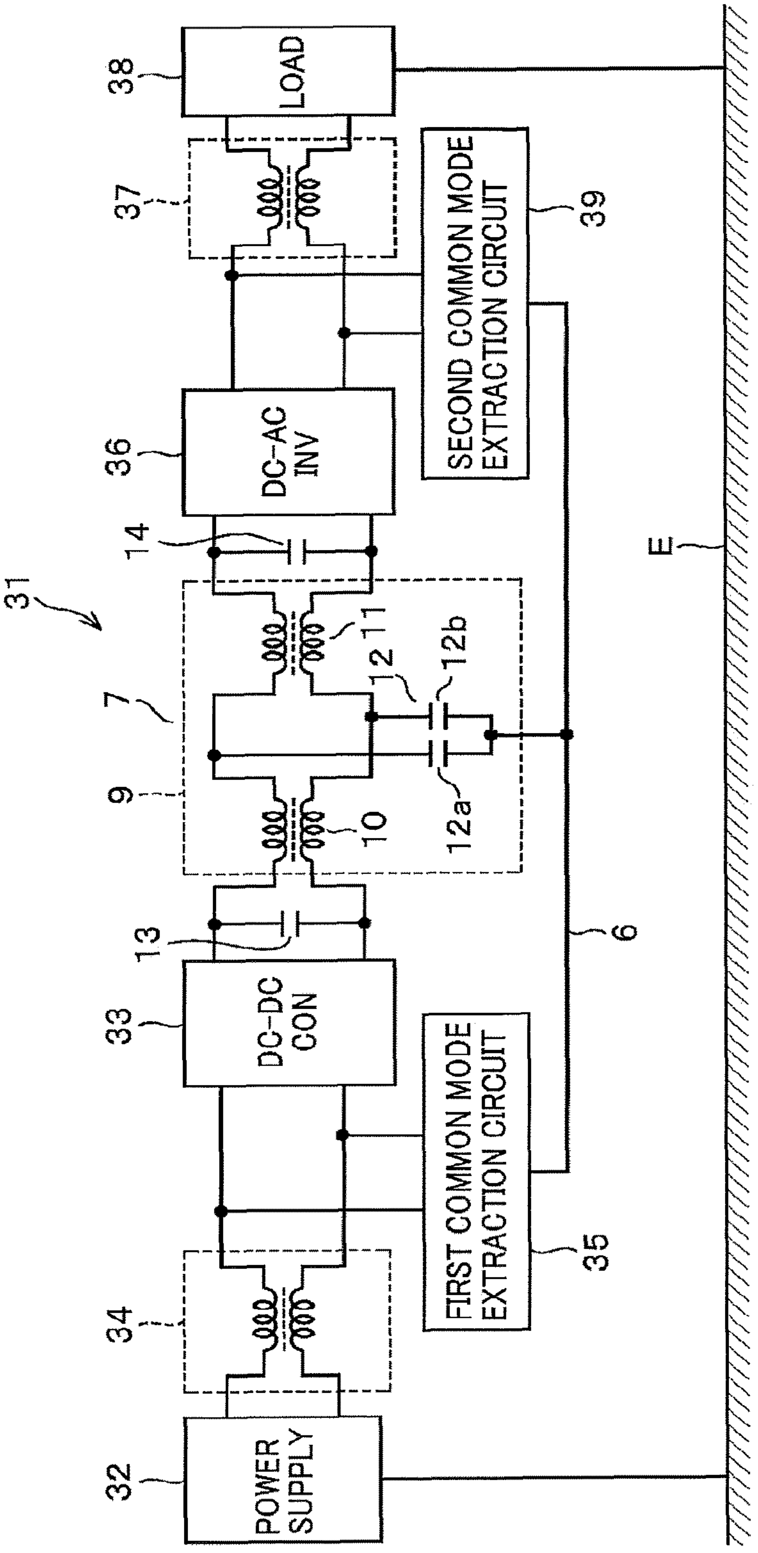
FIG. 6 shows a fourth embodiment, and is a functional block diagram showing a power conversion device applied to a power conditioner.

A power conversion device 31 of the fourth embodiment shown in FIG. 6 is a case of being applied to a power conditioner used for, for example, a solar power generation device or other devices. A power supply 32 is, for example, a solar cell, and generates DC power and outputs the generated power. A DC-DC converter 33 corresponding to a first power conversion circuit is connected to the power supply 32 via an external impedance adjustment circuit 34. The external impedance adjustment circuit 34 is configured with, for example, a common mode choke coil. Between input terminals of the DC-DC converter 33 and the virtual neutral potential line 6, a first common mode extraction circuit 35 is connected. The DC-DC converter 33 converts an inputted DC voltage into a different voltage and outputs the converted voltage.

Output terminals of the DC-DC converter 33 are connected, via the DC link part 7, to input terminals of a DC-AC inverter 36 corresponding to the second power conversion circuit. Output terminals of the inverter 36 are connected to a load 38 via an external impedance adjustment circuit 37.

The inverter 36 converts the inputted DC power into a single-phase AC power and outputs the converted power to the load 38. The load 38 is, for example, a single-phase AC power supply line of a commercial AC power supply system. Between the output terminals of the inverter 36 and the virtual neutral potential line 6, a second common mode extraction circuit 39 is connected. Note that the common mode extraction circuits 35 and 39 may be connected when impedance adjustment is required in accordance with the state of occurrence of the leakage current or noise.

According to the fourth embodiment configured as described above, the power conversion device 31 can be applied to the power conditioner.

Fifth Embodiment

Figure 7:
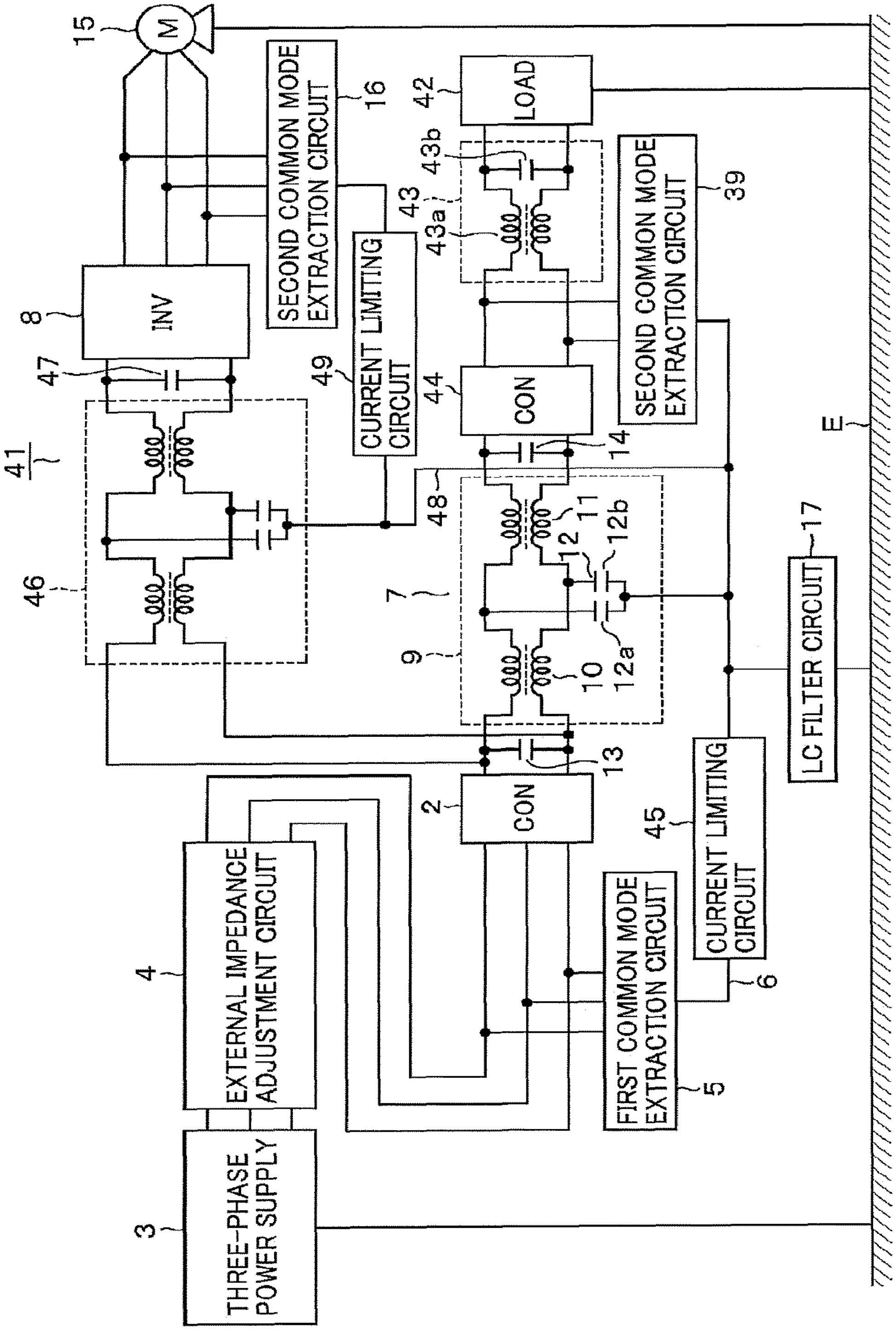
FIG. 7 shows a fifth embodiment, and is a functional block diagram showing a power conversion device in which a second power conversion circuit is parallelized.

A power conversion device 41 of the fifth embodiment shown in FIG. 7 has a configuration in which the two second power conversion circuits are connected to the DC link part 7 in parallel. A converter 44 connected between the DC link part 7 and a load 42, via an external impedance adjustment circuit 43, performs DC-DC conversion. The external impedance adjustment circuit 43 includes a common mode choke coil 43*a* and a capacitor 43*b* connected between terminals on the load 42 side. Between the output terminals of the converter 44 and the virtual neutral potential line 6, a second common mode extraction circuit 39 is connected. A current limiting circuit 45 is inserted into the virtual neutral potential line 6. The current limiting circuit 45 is disposed to prevent an excessive current from flowing into the virtual neutral potential line 6, and is configured with, for example, other than single use of resistance or single use of inductor, those considering frequency characteristics, such as an RC parallel circuit.

To output terminals of the converter 2, a smoothing capacitor 47, the inverter 8 and the three-phase motor 15 are connected via another DC link filter circuit 46. The filter circuit 46 corresponds to a parallel DC link filter circuit. The respective-phase output terminals of the inverter 8 are connected to the input terminals of the common mode extraction circuit 16, respectively. The common connection point of the Y-shaped capacitor constituting the DC link filter circuit 46 is connected to the virtual neutral potential line 6 via a virtual neutral potential sharing line 48. Between the common mode extraction circuit 16 and the virtual neutral potential sharing line 48, another current limiting circuit 49 is connected.

Note that the connection mode of the virtual neutral potential sharing line 48 is not limited to the one shown in the figure, and the line 48 may be connected to a portion other than the power line. When the leakage current is increased by multiple frequencies, the time constant is set so that the LC filter circuit 17 shows a low impedance at the relevant frequency.

According to the fifth embodiment configured as described above, in the configuration in which the converter 44 and the inverter 8 that are the second power conversion circuits are connected to the DC link part 7 in parallel and are operated by sharing the virtual neutral potential line 6, the leakage current can be suppressed.

Sixth to Eighth Embodiments

The sixth to eighth embodiments show variations of positions for inserting the first and second common mode choke coils. Note that, in FIGS. 8 to 10 corresponding to these embodiments, components corresponding to those of the first embodiment are assigned with the same reference signs to schematically illustrate the embodiments, and the Y-shaped capacitor 12 in the DC link part 7 is indicated by a symbol of a single capacitor.

Figure 8:
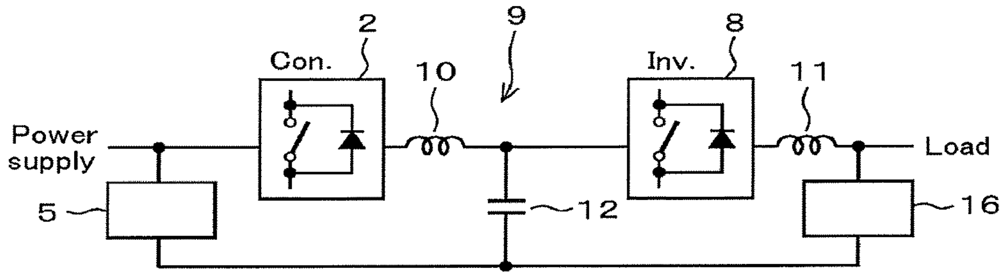
FIG. 8 shows a sixth embodiment, and is a functional block diagram simply showing a configuration of a power conversion device.

In the sixth embodiment shown in FIG. 8, the common mode choke coil 11 is inserted into a route from the inverter 8 to the common mode extraction circuit 16.

Figure 9:
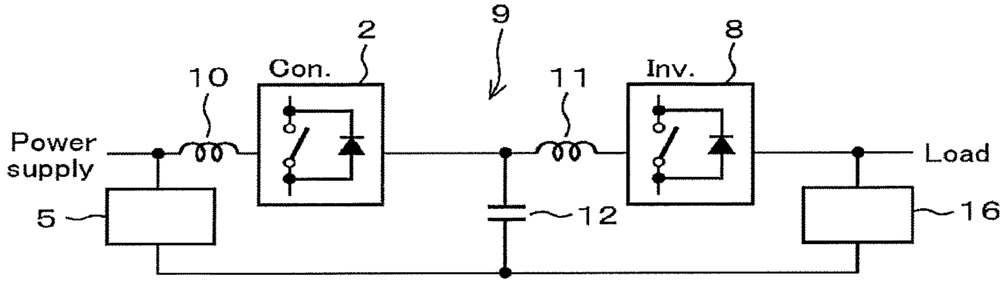
FIG. 9 shows a seventh embodiment, and is a functional block diagram simply showing a configuration of a power conversion device.

In the seventh embodiment shown in FIG. 9, the common mode choke coil 10 is inserted into a route from the common mode extraction circuit 5 to the converter 2.

Figure 10:
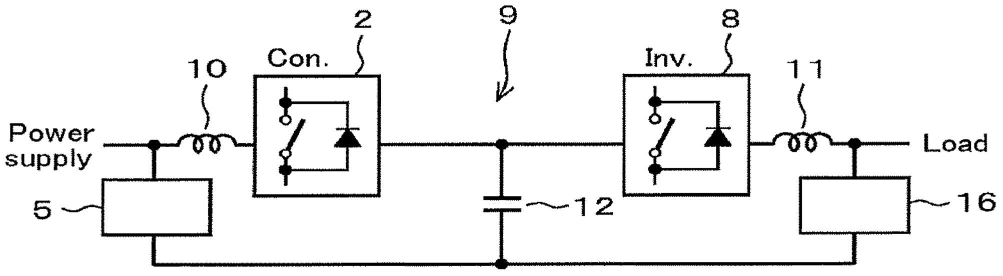
FIG. 10 shows an eighth embodiment, and is a functional block diagram simply showing a configuration of a power conversion device.

In the eighth embodiment shown in FIG. 10, the common mode choke coil 10 is inserted into a route from the common mode extraction circuit 5 to the converter 2, and the common mode choke coil 11 is inserted into a route from the inverter 8 to the common mode extraction circuit 16. With these configurations, also, effects similar to those in the first embodiment can be obtained.

OTHER EMBODIMENTS

The first power conversion circuit may have a configuration to perform power conversion by diode rectification.

In the first to fourth embodiments and the sixth to eighth embodiments, the current limiting circuit may be inserted into the virtual neutral potential line 6.

When two or more power conversion devices of the first to fourth embodiments and the sixth to eighth embodiments are used in parallel connection, a power conversion system may be configured by connecting the virtual neutral potential lines 6 of these devices in common.

In the fifth embodiment, three or more rows of the configuration including the second power conversion circuit and components subsequent thereto may be connected in parallel.

While certain embodiments of the present invention have been described, these embodiments have been presented by way of example only and are not intended to limit the scope of the present invention. These new embodiments can be practiced in various other forms, and various omissions, substitutions and changes may be made without departing from the gist of the invention. These embodiments and modifications thereof are included in the scope or the gist of the invention, and the invention as recited in the claims and equivalents thereof.

What is claimed is:

1. A power conversion device comprising:

a first power conversion circuit that converts power inputted from outside and outputs the converted power;

a second power conversion circuit that is connected to the first power conversion circuit via a DC link part and converts inputted power to output the converted power to a load;

smoothing capacitors provided in an output part of the first power conversion circuit and an input part of the second power conversion circuit;

a first common mode current extraction circuit provided in an input part of the first power conversion circuit;

a second common mode current extraction circuit provided in an output part of the second power conversion circuit;

a virtual neutral potential line that connects the first common mode current extraction circuit and the second common mode current extraction circuit;

a DC link filter circuit that includes a Y-shaped capacitor connected between the DC link part and the virtual neutral potential line;

a first common mode coil inserted into a route from the first common mode current extraction circuit to a connection point of the Y-shaped capacitor in the DC link filter circuit; and a second common mode coil inserted into a route from the connection point of the Y-shaped capacitor to the second common mode current extraction circuit.

2. The power conversion device according to claim 1, wherein the first and second common mode coils are connected in series and are disposed within the DC link filter circuit, and the Y-shaped capacitor is connected between common connection points of the first and second common mode coils and the virtual neutral potential line.

3. The power conversion device according to claim 1, wherein the DC link filter circuit includes a coil inserted between a common connection point of the Y-shaped capacitor and the virtual neutral potential line.

4. The power conversion device according to claim 1, further comprising:

an LC filter circuit connected between the virtual neutral potential line and a ground potential.

5. The power conversion device according to claim 2, further comprising:

an LC filter circuit connected between the virtual neutral potential line and a ground potential.

6. The power conversion device according to claim 3, further comprising:

an LC filter circuit connected between the virtual neutral potential line and a ground potential.

7. The power conversion device according to claim 1, further comprising:

an external impedance adjustment circuit provided in at least one of an input part of the first common mode current extraction circuit and/or an output part of the second common mode current extraction circuit.

8. The power conversion device according to claim 2, further comprising:

an external impedance adjustment circuit provided in at least one of an input part of the first common mode current extraction circuit and/or an output part of the second common mode current extraction circuit.

9. The power conversion device according to claim 3, further comprising:

an external impedance adjustment circuit provided in at least one of an input part of the first common mode current extraction circuit and/or an output part of the second common mode current extraction circuit.

10. The power conversion device according to claim 4, further comprising:

an external impedance adjustment circuit provided in at least one of an input part of the first common mode current extraction circuit and/or an output part of the second common mode current extraction circuit.

11. The power conversion device according to claim 5, further comprising:

an external impedance adjustment circuit provided in at least one of an input part of the first common mode current extraction circuit and/or an output part of the second common mode current extraction circuit.

12. The power conversion device according to claim 6, further comprising:

an external impedance adjustment circuit provided in at least one of an input part of the first common mode current extraction circuit and/or an output part of the second common mode current extraction circuit.

13. The power conversion device according to claim 1, further comprising:

two or more parallel power conversion circuits each corresponding to the second power conversion circuit;

parallel DC link parts that connect between the output part of the first power conversion circuit and input parts of the parallel power conversion circuits; and parallel DC link filter circuits connected between the parallel DC link parts and the virtual neutral potential line.

14. The power conversion device according to claim 1, further comprising:

a current limiting circuit inserted into the virtual neutral potential line.

15. A power conversion system comprising:

a plurality of power conversion devices according to claim 1, wherein the virtual neutral potential lines of the respective plurality of power conversion devices are connected in common.

* * * * *